UNITED STATES PATENT OFFICE.

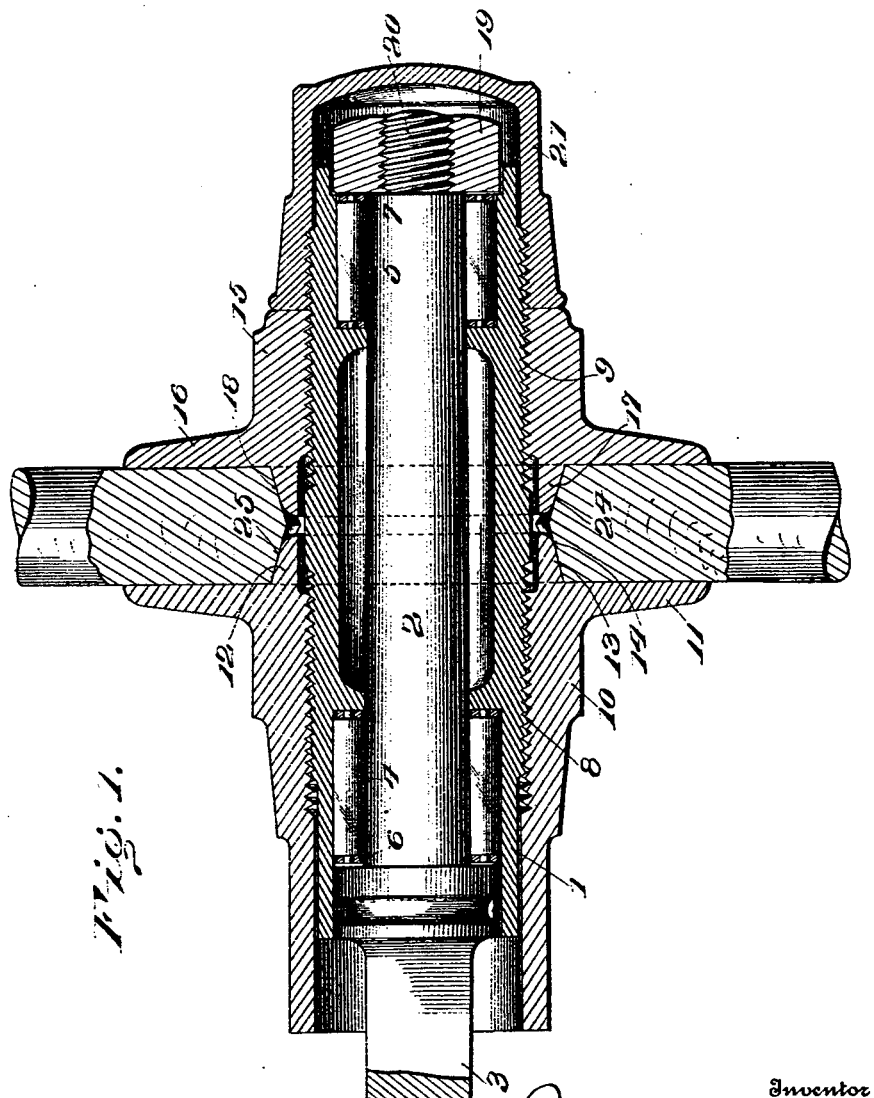

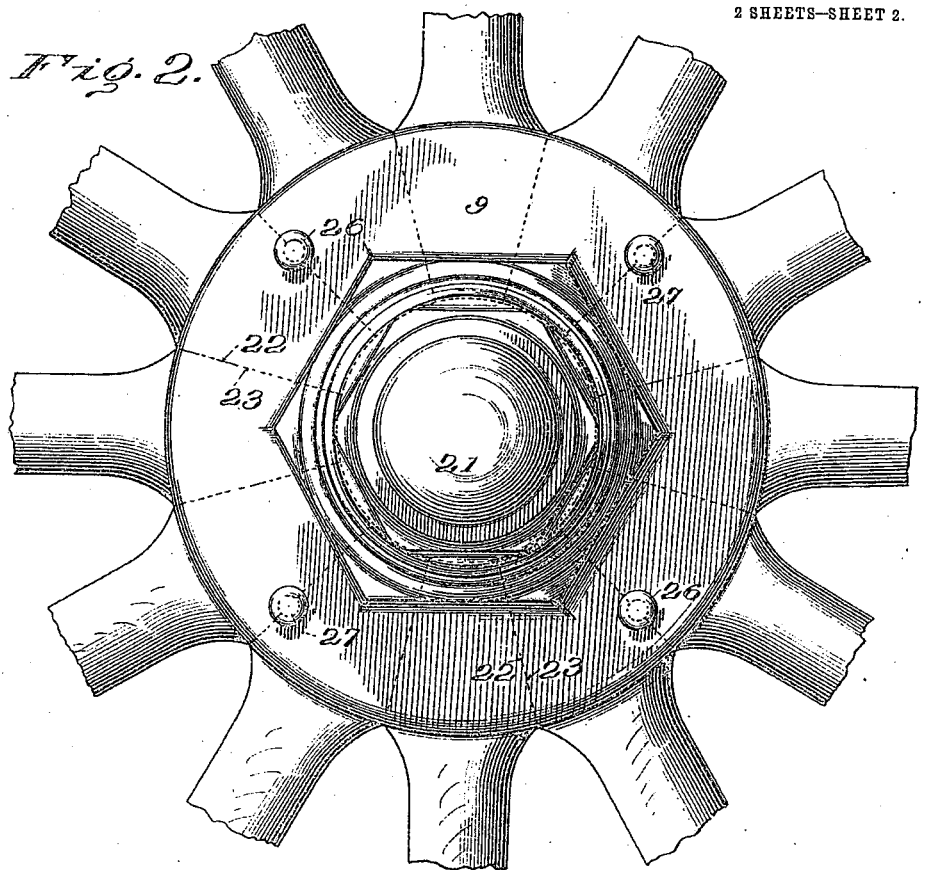
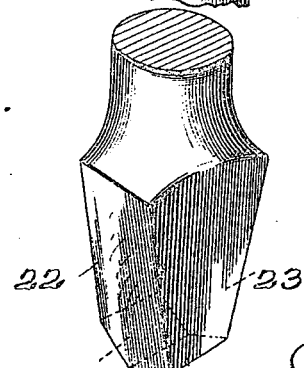

JOSHUA J. ALTMAN, OF PINEMOUNT, FLORIDA.

WHEEL-HUB.

1,051,184.  Specification of Letters Patent.  Patented Jan. 21, 1913.

Application filed March 27, 1912. Serial No. 686,525.

*To all whom it may concern:*

Be it known that I, JOSHUA J. ALTMAN, a citizen of the United States, residing at Pinemount, in the county of Suwanee and State of Florida, have invented certain new and useful Improvements in Wheel-Hubs, of which the following is a specification.

My invention relates to an improvement in wheel hubs, and the object is to provide a hub composed of few parts which are readily assembled and disassembled to permit of the replacing of a broken spoke, or for any other purpose, and which, when assembled, holds the inner ends of the spokes tightly clamped between two of its members, and at the same time forces the spokes out against the felly of the wheel.

This invention consists in certain other novel features of construction and combinations of parts which will be hereinafter fully described and pointed out in the claim.

In the accompanying drawings:—Figure 1 is a longitudinal sectional view through my improved hub showing the parts in their assembled position, Fig. 2 is a view in side elevation looking at the outer end of the hub, and Fig. 3 is a detail perspective view of the inner end of one of the spokes.

A bushing 1 is bored to receive the spindle 2 of an ordinary axle 3, and the bushing is further counterbored at each end to receive the roller bearings 4 and 5 which are held in alinement by the cages 6 and 7. The bushing 1 has a right-hand screw-thread 8 formed upon one end, and a left-hand thread 9 formed upon the other. An internally screw-threaded jam-nut 10 has the threads thereof cut to fit the threads 8 on the bushing 1, and near one end has a flange 11 formed approximately at right angles to its central bore. A spreading-flange 12 is formed on the outer face of the flange 11 around the screw-threaded bore of the jam-nut 10 and has its inner bore preferably slightly larger than the bore of the screw-threaded portion. Spreading-flange 12 has its outer face 13 beveled in such a manner that it presents practically a truncated-cone, and the outer edge of this cone is preferably rounded at 14 that the flange may more readily move beneath the inner end of the spokes in assembling the several parts of the hub. A jam-nut 15 is internally screw-threaded to fit the screw-threads 9 of the bushing, and has the flange 16 and spreading-flange 17 which is beveled on its outer face 18, both of which are similar in every respect to those carried by the jam-nut 10. An axle nut 19 is screw-threaded upon the outer end 20 of the axle spindle 2 to hold the bushing and hub upon the spindle, and a dust-cap 21 is adapted to be screwed upon the threads 9 on the outer end of the bushing to prevent dust from passing into the bearing formed in the bushing. The spokes, of which there may be any number, have the bevel faces 22 and 23 formed near their inner ends in such a manner that when the spokes are assembled in the felly the contiguous faces at the inner ends fit together and form a solid structure as shown in Fig. 2.

The extreme ends of the spokes are made in the shape of a blunt wedge by forming the two bevels 24 and 25 thereon, and these bevels are engaged by the surfaces 13 and 18 of the spreading-flanges 12 and 17 carried by the two jam-nuts which force the spokes outward and seat them tightly in the felly of the wheel. As a means of preventing the jam-nuts 10 and 15 from unscrewing from the bushing 1, bolts or rivets 26 may be inserted through openings 27 formed in the two jam-nuts.

In assembling a wheel using my improved hub, the operation would be as follows:—The spokes would be secured in the felly of the wheel by having the tenons on their ends inserted within the openings in the felly, or in any other suitable manner. The bushing 2 is then inserted through the opening at the inner ends of the spokes, and the jam-nuts 10 and 15 are screwed upon their respective ends of the bushing. When the nuts 10 and 15 have been screwed a sufficient distance, the bevel faces 13 and 18 of the spreading-flanges 12 and 17 engage with the bevel portions 24 and 25 on the inner ends of the spokes, and force them outward against the felly, and as the nuts are screwed still farther upon the bushing, the spokes are engaged at their sides by the inner faces of the flanges 11 and 16, between which they are firmly clamped and held.

It will thus be seen that I have provided a hub by which the spokes are held rigidly against side-wise and circumferential displacement, and with which the outward or endward pressure is distributed over the greater area of the inner end of the spoke.

Having fully described my invention, what I claim as new and desire to secure by Letters Patent, is:—

The combination with a bushing having external right and left screw-threads, jam-nuts having outwardly-extending flanges and spreading flanges extending toward each other, the latter having an inclined outer surface, of spokes having a blunt wedge formation at the inner end adapted to be engaged by the inclined surfaces of the inwardly-projecting flanges while the edges of the spokes are embraced by the outwardly-extending flanges.

In testimony whereof I affix my signature, in the presence of two witnesses.

JOSHUA J. ALTMAN.

Witnesses:
J. D. BLANTON,
J. D. SUMMER.